(12) United States Patent
Johnson et al.

(10) Patent No.: US 7,258,107 B2
(45) Date of Patent: Aug. 21, 2007

(54) TEMPERATURE-CONTROLLED FUEL INJECTION SYSTEM FOR TWO-STROKE ENGINES

(75) Inventors: Daniel J. Johnson, Thief River Falls, MN (US); Kim Chervestad, Oklee, MN (US); Greg Spaulding, Red Lake Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 110 days.

(21) Appl. No.: 11/185,912

(22) Filed: Jul. 20, 2005

(65) Prior Publication Data

US 2006/0016434 A1    Jan. 26, 2006

Related U.S. Application Data

(63) Continuation-in-part of application No. 10/346,909, filed on Jan. 17, 2003, now abandoned.

(51) Int. Cl.
*F02B 33/04* (2006.01)
*F02M 51/00* (2006.01)

(52) U.S. Cl. ............... 123/435; 123/478; 123/73 B
(58) Field of Classification Search ............ 123/73 C, 123/435, 478, 73 A, 73 B
See application file for complete search history.

(56) References Cited

U.S. PATENT DOCUMENTS 5,050,551 A * 9/1991 Morikawa .................. 123/305
6,367,450 B1 * 4/2002 Kato ..................... 123/406.26

* cited by examiner

*Primary Examiner*—Stephen K. Cronin
*Assistant Examiner*—Hyder Ali
(74) *Attorney, Agent, or Firm*—Balck Lowe & Graham, PLLC

(57) ABSTRACT

The present invention provides a system and method for controlling a two-stroke engine in correspondence with exhaust gas temperature. An engine control unit (ECU) receives an output from a temperature sensor mounted in the exhaust pipe. The engine control unit controls the operation of a fuel injector in fluid communication with the intake port of the engine in correspondence with the output from the temperature sensor. In one embodiment, correspondence is achieved by determining fuel injection parameters based on a plurality of maps, each corresponding to a different temperature range. The ECU references the map corresponding to the sensed temperature of the exhaust gas. Fuel injection parameters may include injection timing and the amount of fuel injected.

19 Claims, 3 Drawing Sheets

TEMPERATURE-CONTROLLED FUEL INJECTION SYSTEM FOR TWO-STROKE ENGINES

PRIORITY CLAIM

This application is a continuation-in-part of U.S. patent application Ser. No. 10/346,909, filed Jan. 17, 2003, now abandoned and entitled TWO-CYCLE ENGINE WITH EXHAUST TEMPERATURE-CONTROLLED IGNITION TIMING.

FIELD OF THE INVENTION

This invention relates generally to two-stroke engines and, more specifically, to fuel injection control systems for two-stroke engines.

BACKGROUND OF THE INVENTION

Two-stroke engines provide the benefit of high power-output-to-weight ratios as compared to a four-stroke engine. This benefit results from the simplicity of operation of the two-stroke engine whereby exhaust of combustion gases from the cylinder and intake of fuel and air are executed simultaneously, such that each downward stroke of the piston is a power stroke. However, combining intake and exhaust in a single stroke creates the possibility that fuel will escape with the exhaust gases. This disadvantage has been reduced in part by injecting fuel directly into the cylinder of the engine. An engine control unit (ECU) typically controls the injection of fuel into the cylinder in order to avoid loss of fuel and to promote efficient combustion.

In a typical system, the ECU varies the amount of fuel injected based on such parameters as the throttle position or crankshaft velocity. However, these parameters do not provide a complete picture of the operating state of the engine as it affects fuel injection. Accordingly, such systems fail to capture improvements in fuel efficiency and emissions reduction that are available.

In view of the foregoing it would be an advancement in the art to more accurately measure the state of the engine insofar as it affects fuel injection and to use such measurements to tune fuel injection to improve fuel efficiency and reduce emissions.

SUMMARY OF THE INVENTION

The present invention provides a two-stroke engine that improves performance by controlling fuel injection in correspondence with changing exhaust temperature in addition to crankshaft velocity and throttle position. A basic two-stroke engine includes a cylinder having exhaust and intake ports. A throttle controls intake of air, or of an air/fuel mixture into the cylinder for combustion. A piston moves within the cylinder and is coupled to a crankshaft, which is rotated thereby. In one embodiment of the present invention, a temperature sensor is in thermal contact with exhaust gases. The output of the thermal sensor is received by an engine control unit (ECU). The ECU likewise measures such parameters as throttle position, crankshaft position, and crankshaft angular velocity.

A fuel injector is in fluid communication with the intake port and injects fuel into the cylinder. The ECU controls operation of the fuel injector based at least in part on the output of the temperature sensor. In one embodiment, the ECU stores a plurality of maps each corresponding to a range of possible temperatures of the exhaust gas. The maps may relate a parameter for controlling the fuel injector to such factors as crankshaft velocity and throttle position. The ECU selects a parameter from the map corresponding to the temperature sensed by the temperature sensor. In the illustrated embodiments, the fuel injection parameter may be the size of the charge of fuel injected into the cylinder or the timing of injection of fuel into the cylinder with respect to crankshaft or piston position. In some embodiments, both fuel injection size and injection timing are adjusted in accordance with temperature.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
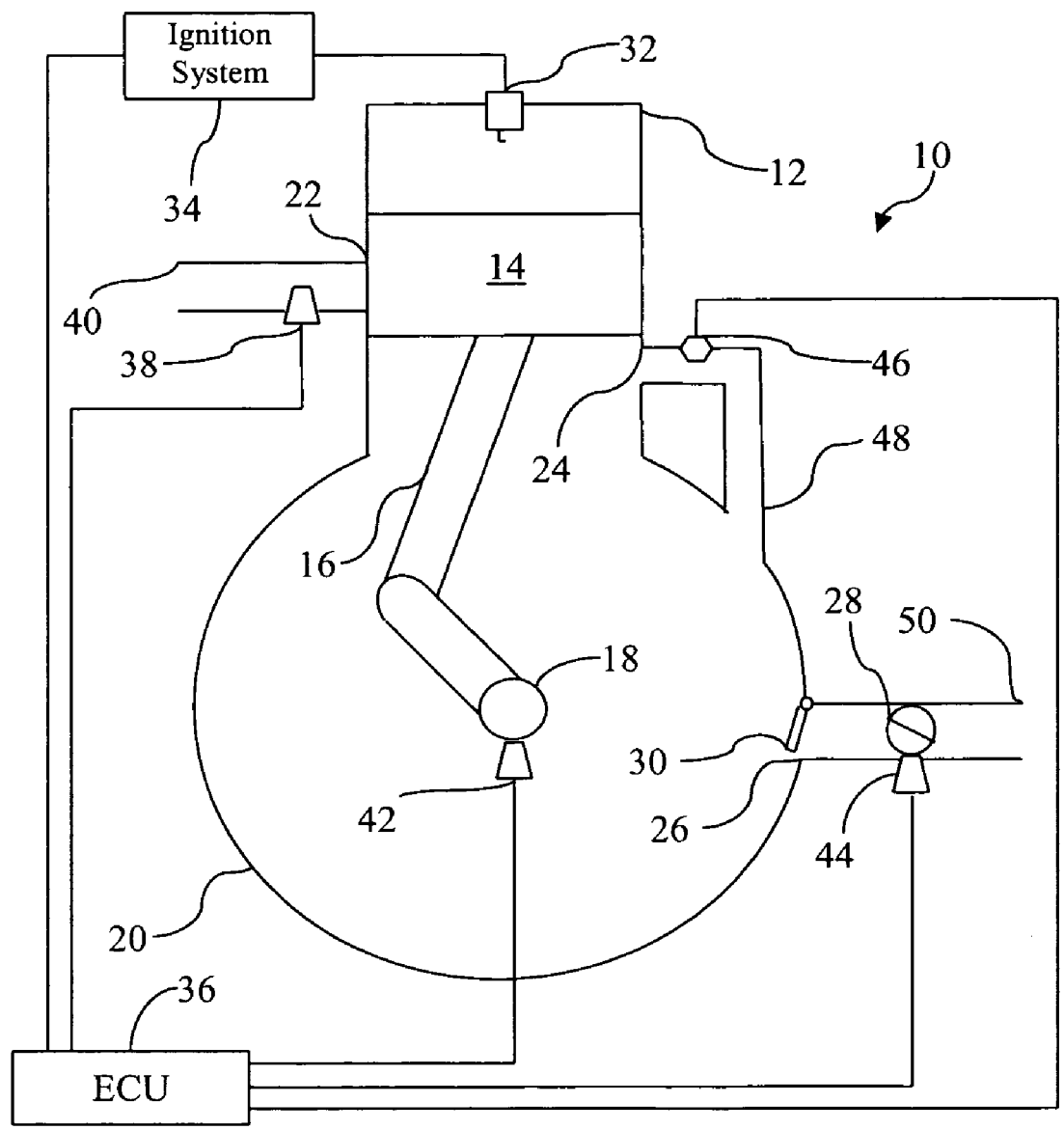
FIG. 1 is a schematic view of an electronically controlled two-stroke engine, in accordance with one embodiment of the present invention.

Referring to FIG. 1, a typical two-stroke engine 10 includes a cylinder 12 receiving a piston 14. A piston rod 16 couples the piston 14 to a crankshaft 18 and transfers force between the piston 14 and the crankshaft 18. A crankcase 20 surrounds the crankshaft 18 and secures to the cylinder 12 creating a sealed chamber, other than ports created in the crankcase 20 and cylinder 12. An exhaust port 22 and cylinder intake port 24 are formed in the cylinder 12. The exhaust port 22 and cylinder intake port 24 may be on the same or opposite sides of the cylinder 12. The exhaust port 22 and intake 24 may be offset vertically with the intake port 24 located lower on the cylinder 12. A crankcase intake port 26 is formed in the crankcase 20 and is in fluid communication with a throttle 28. A check valve 30, such as a reed valve, is interposed between the throttle 28 and the crankcase intake port 26 and only permits flow into the cylinder 12.

Electrical components of the engine 10 may include an ignition device 32, such as a spark plug, located at the top of the cylinder 12. The ignition device 32 is coupled to an ignition system 34 that supplies the ignition device 32 with sufficient power to ignite fuel within the cylinder 12. An engine control unit (ECU) 36 may be electrically connected to the ignition system 34 and control such parameters as the timing of activation of the ignition device 32.

Sensors may be coupled to various members of the engine 10 and supply information to the ECU 36. A temperature sensor 38 is positioned in or near an exhaust pipe 40 coupled to the exhaust port 22 to detect the temperature of exhaust gasses. A crankshaft motion sensor 42 may engage the crankshaft 18 and detect the angular velocity and position of the crankshaft 18. The crankshaft motion sensor 42 may be embodied as a single sensor or two separate sensors each measuring one of angular velocity and position. A throttle sensor 44 may measure the position of the throttle 28.

Fuel may be supplied to the cylinder 12 for combustion in a number of ways. In the illustrated embodiment, the fuel is introduced by a fuel injector 46 positioned within the cylinder intake tube 48. Alternatively, the fuel injector 46 may be positioned within the crankcase intake tube 50 on either side of the throttle 28. The fuel injector 46 receives fuel from a fuel source and is controlled by the ECU 36. The fuel injector 46 may be a valve, which opens to permit pressurized fuel to pass therethrough. Alternatively, the fuel injector 46 may be a pump, or like device, supplying the force to propel fuel into the cylinder 12.

The present invention provides an improved method for injecting fuel into the cylinder 12. In one embodiment, the ECU 36 varies the function of the fuel injector 44 based on the temperature of exhaust gasses as measured by the temperature sensor 38. The ECU may vary two parameters based on temperature, namely, the amount of fuel injected into the cylinder 12 and the timing of the injection relative to the position of the piston within the cylinder.

Experiments conducted by the inventors have indicated that low emissions and smooth engine performance are possible at normal operating conditions with a lean fuel-air mixture in the cylinder 12. In contrast, at lower operating temperatures a richer fuel-air mixture may enable the engine to accelerate without hesitation. The amount of fuel entering the cylinder 12 may be varied by controlling one or more of the amount of time the fuel injector 46 remains open, how much the fuel injector 46 is opened, or the pressure of the fuel passing through the fuel injector.

Variation in injection timing likewise accommodates changes in the properties of the gases within the cylinder 12 and exhaust pipe 40. During operation of a two-stroke engine 10, the air within the cylinder 12 is combusted, driving the piston 14 downwardly past the exhaust port 22. The exhaust gases then leave the cylinder at high speed through the exhaust port 22 into the exhaust pipe 40. The exit of the exhaust gases are accompanied by a high amplitude pressure wave that travels outwardly from the exhaust port 22 and then is reflected back by components of the exhaust system. Typical engines are tuned such that at typical operating speeds the return wave strikes the exhaust port 22 substantially simultaneously with the intake of a fresh charge of fuel and air into the cylinder 12, such that minimal amounts of fuel escape through the exhaust port 22. However, the speed of the pressure wave varies with air temperature. Accordingly, varying the injection timing may provide a means to accommodate this change in velocity such that the injection of fuel into the cylinder 12 is properly coordinated with the return pressure wave, or "plugging pulse," regardless of temperature.

Figure 2:
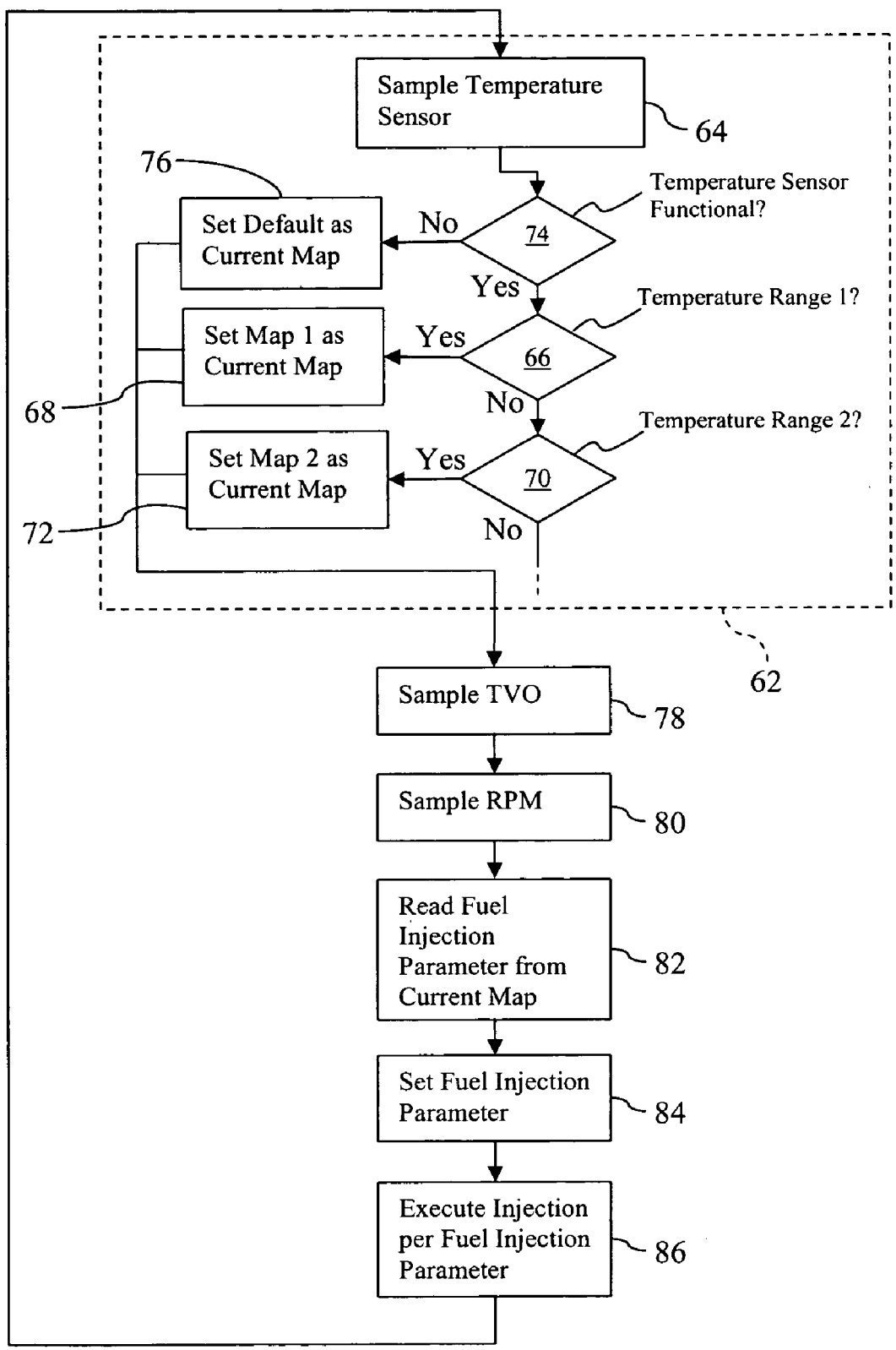
FIG. 2 is a flow chart of a method for controlling a two-stoke engine based on temperature, in accordance with one embodiment of the present invention.

Referring to FIG. 2, one method for controlling a two-stroke engine 10 may include executing a temperature mapping process 62. The temperature mapping process 62 may set the values of various parameters within the ECU 36 based on the temperature of exhaust gases as sensed by the temperature sensor 38. The temperature mapping process 62 may be executed once for every iteration of the method or may be omitted during some but not all iterations of the method. For example, the temperature mapping process 62 may be executed and then re-executed only after a proscribed delay has passed.

The temperature mapping process 62 may include determining which of a plurality of maps having the form illustrated in Table 1 will be used to determine operating parameters governing the fuel injector 44.

TABLE 1

Fuel Injection Parameter Map.

|  | $TVO_1$ | $TVO_2$ | $TVO_3$ | $TVO_4$ |
| --- | --- | --- | --- | --- |
| $RPM_1$ | $A_{11}$ | $A_{12}$ | $A_{13}$ | $A_{14}$ |
| $RPM_2$ | $A_{21}$ | $A_{22}$ | $A_{23}$ | $A_{24}$ |
| $RPM_3$ | $A_{31}$ | $A_{32}$ | $A_{33}$ | $A_{34}$ |
| $RPM_4$ | $A_{41}$ | $A_{42}$ | $A_{43}$ | $A_{44}$ |

The rows of Table 1 correspond to different angular velocities, typically measured in RPM, of the crankshaft 18. Alternatively, the rows of Table 1 may correspond to another measure of the operating speed of the engine, such as piston velocity, or the like. The columns of Table 1 correspond to different throttle valve openings (TVO) of the throttle 28. The parameters $A_{ij}$ represent values of a parameter used to control the fuel injector 46. In the illustrated embodiment the parameters $A_{ij}$ may be a multiplier that the ECU 36 will use to increase or decrease the amount of fuel injected into the cylinder 12 during an exhaust/intake stroke. For example, the ECU may multiply a value representing the current fuel injection size by a parameter $A_{ij}$ to determine a new value governing the fuel injection size during a subsequent exhaust/intake stroke. In some embodiments, the values $A_{ij}$ represent the length of time in which the fuel injector 46 remains open or multipliers applied to values indicating how long the fuel injector 46 is to remain open.

In other embodiments, the parameter $A_{ij}$ represents an angular position of the crankshaft 18 at which the ECU 36 will cause the fuel injector 46 to inject fuel into the cylinder 12. In still other embodiments, two types of maps having the form of Table 1 may be used, one having values $A_{ij}$ representing fuel injection size and the other having values $A_{ij}$ representing a crankshaft position at which fuel injection will occur. It will be noted that crankshaft position is a convenient measure of the position of the piston 14 within the cylinder 12 and therefore is not the only parameter that may be used to time fuel injection. For example, a piston position sensor or other measure of the state of the engine 10 may be used.

In one embodiment, the temperature mapping process 62 includes sampling 64 the output of the temperature sensor 38. The process 62 may then include evaluating 66 whether the sampled temperature lies within Temperature Range 1. If it does, Map 1 corresponding to Temperature Range 1 is set 68 as the Current Map. If not, the process 62 may include evaluating 70 whether the sampled temperature lies within Temperature Range 2. If so, Map 2 corresponding to Temperature Range 2 is set 72 as the Current Map. Steps similar to steps 70 and 72 may be repeated for other temperature ranges each with a corresponding map. In the preferred embodiment, five maps are used however more or fewer maps may be used.

The process 62 may also include evaluating 74 the status of the temperature sensor 38. It may be undesirable to set fuel injection parameters based on a reading from a failed temperature sensor 38. Accordingly, evaluating 74 may include verifying that the sensor 38 is functioning. If so, the process 62 may proceed to step 66. If not, the process 62 may include setting 76 the Current Map to a Default Map. The Default Map may be a map providing parameters enabling the engine 10 to run across a range of typical temperatures.

The method may further include sampling 78 throttle position and sampling 80 crankshaft velocity, as measured by the crankshaft position sensor 42 and throttle position sensor 44. The method may then include reading 82 the value $A_{ij}$ corresponding to the sampled throttle position and crankshaft velocity from the Current Map. The fuel injection parameter may then be set 84 to the value $A_{ij}$ read in step 82. The process 62 may then include injecting 86 fuel into the cylinder 12 according to parameters set in step 84.

Various embodiments and alternatives of method are contemplated by the present invention. For example, various methods to evaluate the temperature of engine exhaust and vary fuel injection parameters in correspondence therewith are possible. In one embodiment, fuel injection parameters such as injection amount and injection timing may be determined by executing an equation that is a function of one or more of exhaust temperature, crankshaft velocity, and crankshaft position.

Figure 3:
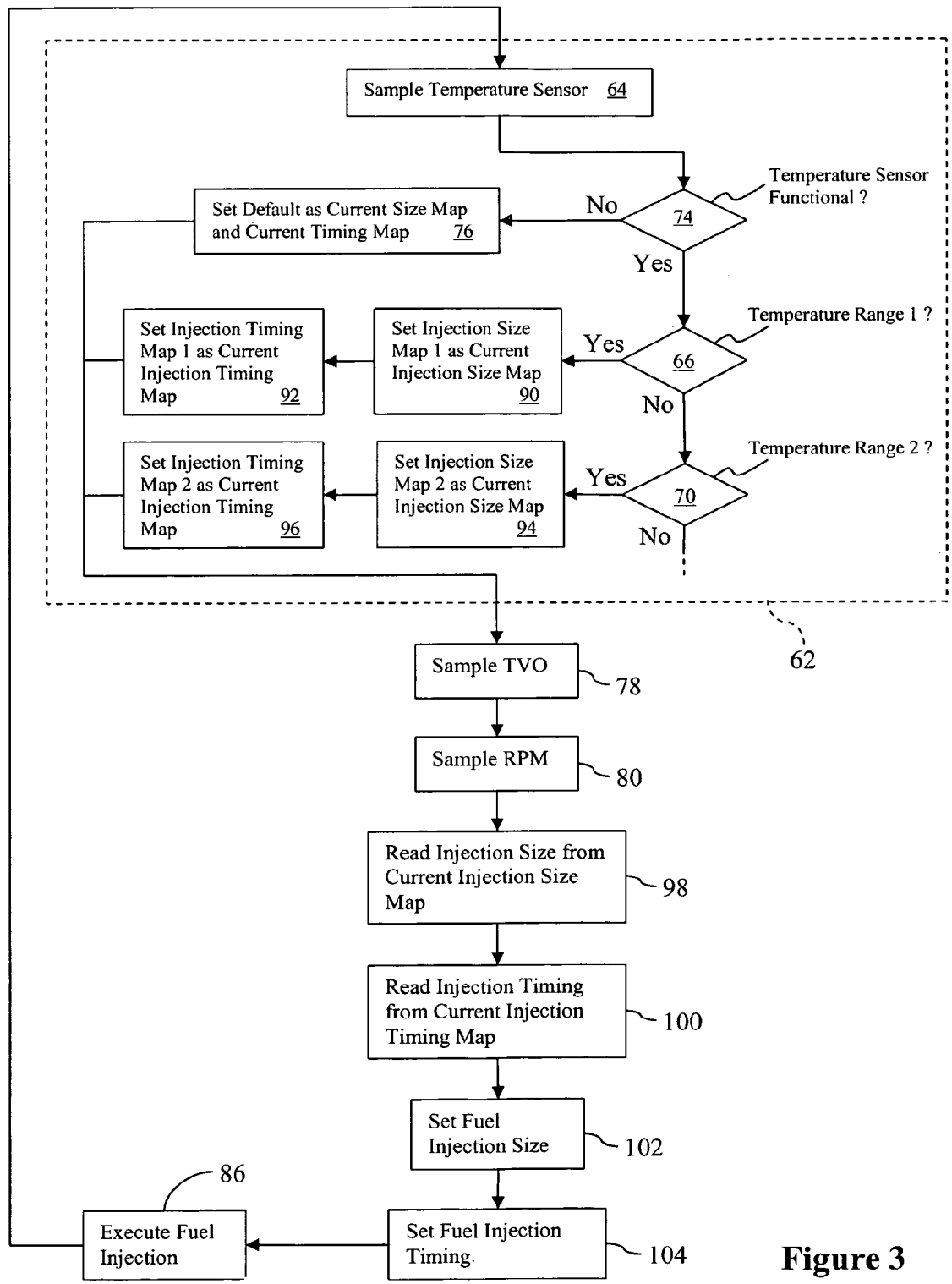
FIG. 3 is a flow chart of an alternative embodiment of a method for controlling a two-stroke engine based on temperature, in accordance with one embodiment of the present invention.

Referring to FIG. 3, a method may include adjusting more than one fuel injection parameter. For example, the temperature mapping process 62 may include setting 90 an Injection Size Map 1 as a Current Injection Size map and setting 92 an Injection Timing Map 1 as a Current Injection Timing Map if step 66 determines that the sensed temperature is within Temperature Range 1. The process 62 may include setting 94 the Current Injection Size map to an Injection Size Map 2 and setting 96 the Current Injection Timing Map to an Injection Timing Map 2 if step 70 determines that the sensed temperature is within Temperature Range 2. Steps similar to steps 66, 90, and 92 may be executed to set additional Injection Size Maps and Injection Timing Maps corresponding to additional temperature ranges as the Current Injection Size Map and Current Injection Timing Map. In the preferred embodiment, five temperature ranges are used. Where the temperature sensor fails, step 76 may include setting both the Current Injection Size Map and Current Injection Timing Map equal to default maps.

In some embodiments, different parameters may be mapped based on different temperature ranges. For example, injection timing may be determined based on maps having the form of Table 1 corresponding one set of temperature ranges, whereas injection size may be determined based on maps corresponding to a second set of temperature ranges different than the first set of temperature ranges.

The method may further include reading 98 a fuel injection size from the Current Injection Size map and reading 100 a fuel injection time from the Current Injection Timing Map. The values read in steps 98, 100 may then be set 102, 104 as the Current Injection Size and Current Injection Time, respectively. Injecting 86 fuel into the cylinder 12 may then include injecting a charge of fuel having the Current Injection Size at the Current Injection Time.

The method of FIGS. 2 and 3 may be executed concurrently or in sequence with the process for executing temperature dependent ignition timing described in U.S. Pat. Nos. 6,237,566, 6,371,082, and 6,550,450 and published U.S. patent application Ser. No. 10/346,909, filed Jan. 17, 2003, all entitled Two-Cycle Engine With Exhaust Temperature-Controlled Ignition Timing and incorporated herein by reference.

While preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A two-cycle engine comprising
   a throttle;
   a cylinder having an exhaust port and an intake port, the intake port in fluid communication with the throttle;
   a fuel injector in fluid communication with the cylinder;
   a temperature sensor coupled to the exhaust port of the cylinder to measure exhaust gases;
   a piston slidably mounted in the cylinder;
   a rotatable crankshaft for outputting motion of the piston;
   a piston rod connecting the piston to the crankshaft; and
   a control unit electrically coupled to the fuel injector and the temperature sensor, the control unit operable during normal operating conditions and during low temperature operating conditions to identify a temperature range among a plurality of temperature ranges that corresponds to the output from the temperature sensor, the control unit further configured to activate the fuel injector to deliver a fuel charge to the cylinder and to activate the fuel injector based on an injection size map corresponding to the identified temperature range in which a size of the fuel charge varies with operating speed of the piston and throttle position.

2. The two-cycle engine of claim 1, wherein the control unit is configured to control the size of the charge of fuel by opening the fuel injector for periods of varying lengths.

3. The two-cycle engine of claim 1, further comprising:
   a crankshaft motion sensor coupled to the crankshaft;
   the control unit being electrically coupled to the crankshaft motion sensor and further configured to activate the fuel injector based on a crankshaft motion sensor output.

4. The two-cycle engine of claim 3, wherein the crankshaft motion sensor output corresponds to the angular velocity of the crankshaft.

5. The two-cycle engine of claim 3, wherein the crankshaft motion sensor output corresponds to the position of the crankshaft.

6. The two-cycle engine of claim 5, wherein the control unit is further configured to activate the fuel injector upon receiving a triggering output from the crankshaft motion sensor, the control unit altering the value of the triggering output based on the output of the temperature sensor.

7. The two-cycle engine of claim 1, wherein each of the plurality of temperature ranges corresponds to a map of fuel injection control parameters.

8. The two-cycle engine of claim 7, further comprising:
   a crankshaft motion sensor coupled to the crankshaft and configured to produce a velocity output corresponding to the angular velocity of the crankshaft and being electrically coupled to the control unit;
   a throttle position sensor engaging the throttle and being electrically coupled to the control unit; and
   wherein the maps relate a fuel injector activation parameter to the output of the throttle position sensor and the velocity output.

9. The two-cycle engine of claim 8, wherein the fuel injector activation parameter is an amount of fuel injected into the cylinder upon activation of the fuel injector.

10. The two-cycle engine of claim 8, wherein the crankshaft motion sensor produces a position output corresponding to the angular position of the crankshaft and wherein the fuel injector activation parameter is a triggering output, the control unit configured to activate the fuel injector when the crankshaft motion sensor position output is equal to the triggering output.

11. A method for controlling a two-stroke engine comprising:
executing a two-stroke combustion process within a cylinder to produce exhaust gases;
measuring the temperature of the exhaust gases from an exhaust port of the cylinder;
identifying a temperature range among a plurality of temperature ranges that corresponds to the measured temperature of the exhaust gases;
using a fuel injection parameter associated with the identified temperature range to determine a size of a charge of fuel for injection into cylinder during normal operating conditions and during low temperature operating conditions; and
injecting the charge of fuel into the cylinder.

12. The method of claim 11, further comprising:
providing a piston moving within the cylinder;
providing a crankshaft coupled to the piston;
providing an intake port formed in the cylinder;
providing a throttle in fluid communication with the intake port;
measuring the angular velocity of a crankshaft;
measuring the position of the throttle;
providing a plurality of fuel charge maps each corresponding to a range of temperatures, the fuel charge maps relating fuel charge size to angular velocity of the crankshaft and throttle position;
reading a fuel charge size from a particular fuel charge map corresponding to the measured temperature of the exhaust gases; and
injecting a fuel charge having the fuel charge size into the cylinder.

13. The method of claim 12, further comprising:
measuring an angular position of the crankshaft;
calculating a target angular position of the crankshaft based on the measured exhaust temperature; and
injecting fuel into the cylinder when the crankshaft reaches the target angular position.

14. The method of claim 13, further comprising:
providing a plurality of timing maps each corresponding to a range of temperatures, the timing maps relating angular positions of the crankshaft to the angular velocity of the crankshaft and the throttle position; and
wherein calculating a target angular position further comprises reading a particular timing map corresponding to the measured exhaust temperature to retrieve a target angular position.

15. A two-cycle engine comprising:
a cylinder having an exhaust port for exhaust gas;
a throttle;
a piston disposed within the cylinder, and adapted to compress a fuel-air mixture within the cylinder and expel exhaust gas from the cylinder;
a fuel injector in fluid communication with the cylinder;
a temperature sensor for sensing a temperature of exhaust gas from the exhaust port of the cylinder; and
a control unit electrically coupled to the fuel injector and configured to activate the fuel injector to deliver a charge of fuel to the cylinder during normal operating conditions and during low temperature operating conditions, wherein the controller activates the fuel injector according to an injection size map in which fuel charge size varies with operating speed of the piston and throttle position, the control unit being configured to select one of the injection size maps from a plurality of injection size maps based on an output from the temperature sensor.

16. The two-cycle engine of claim 15, wherein activating the fuel injector includes opening the fuel injector to permit passage of pressurized fuel therethrough, and wherein the fuel charge size corresponds to a duration of a period during which the control unit opens the fuel injector.

17. The two-cycle engine of claim 16, wherein the control unit is further configured to activate the fuel injector at a time specified by an injection timing map in which fuel injection time relative to the position of the piston is related to operating speed of the engine and throttle position, the control unit being configured to select the injection timing map from a plurality of injection timing maps based on an output from the temperature sensor.

18. The two-cycle engine of claim 17, further comprising:
a crankshaft coupled to the piston;
a crankshaft motion sensor coupled to the crankshaft; and
wherein the control unit is electrically coupled to the crankshaft motion sensor and further configured to determine piston position and the operating speed of the engine based on an output from the crankshaft motion sensor.

19. The two cycle engine of claim 18, further comprising:
an ignition source in the cylinder;
the control unit being further configured to activate the ignition source at a particular point during the movement of the piston, the control unit containing a plurality of ignition pattern, each of the ignition patterns reflecting desired ignition points that vary as a function of the output of the crankshaft motion sensor, the controller being configured to selecting an ignition pattern based on the output of the temperature sensor.

* * * * *